United States Patent Office 3,351,506
Patented Nov. 7, 1967

3,351,506
NITROCELLULOSE PROPELLANTS PLASTICIZED WITH DIFLUOROAMINO COMPOUNDS
James Grigor and James Brown Parker, Kilwinning, and Andrew Cochran Currie, Largs, Scotland, assignors, by mesne assignments, to the United States of America as represented by the Secretary of the Navy
No Drawing. Original application Sept. 26, 1963, Ser. No. 311,914. Divided and this application July 15, 1965, Ser. No. 484,779
Claims priority, application Great Britain, Sept. 28, 1962, 36,974/62
6 Claims. (Cl. 149—20)

This is a division of application Ser. No. 311,914, filed Sept. 26, 1963.

This invention relates to the preparation of difluoramino compounds and their preparation. More particularly the invention relates to the preparation of 2,3,5,6-tetrakis-(difluoramino)-p-dioxane and alkyl derivatives thereof, and dialkyl difluoramino-substituted epoxide compounds.

According to the present invention, these compounds are prepared by a process comprising refluxing a compound having the formula RCO.COR', where R and R' are H or alkyl groups, with difluoramine in the presence of chlorosulphonic acid or fluorosulphonic acid.

When either R or R' is H, two molecules condense intermolecularly with the elimination of water to give a tetrakis(difluoramino) derivative of p-dioxane, the reaction being

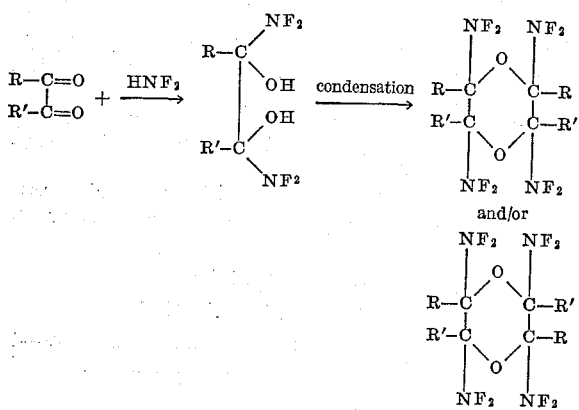

When R and R' are both alkyl groups the difluoraminated compound condenses intramolecularly to form a compound having an epoxide ring in which each carbon has a difluoramino substituent, the reaction being

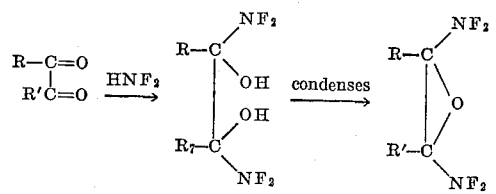

So far as we are aware tetrakis(difluoramino) derivatives of alkyl-substituted p-dioxane and 1,2-dialkyl-substituted derivatives of 1,2-bis(difluoramino)expoxyethane have never hitherto been prepared.

Compounds of the invention are useful as high-energy plasticisers for nitrocellulose in fluoramino explosive compositions and in some cases may be used with advantage to give compositions of higher energy than the corresponding compositions plasticised with nitroglycerine. The epoxide derivatives are potential monomers for the synthesis of $NF_2$ polymeric binders.

The invention is further illustrated by the following examples in which all parts and percentages are by weight.

Example 1

0.5 part of monoglyoxal was dissolved in 10 parts of methylene chloride at room temperature and stirred vigorously whilst approximately 5 parts of liquid difluoramine, produced by condensation of gaseous difluoramine on a "cold-finger" condenser at $-80°$ C., were added dropwise to the solution. Immediately reflux started, 3.5 parts chlorosulphonic acid were added slowly dropwise and reflux continued for a further five hours. Excess difluoramine was then removed by purging with a slow stream of nitrogen, the reaction mixture poured into 10 parts of ice-water and shaken vigorously with a further 10 parts of methylene chloride in a separating funnel. The non-aqueous layer was removed and dried over anhydrous sodium sulphate. Removal of the methylene chloride gave 1 part of a colourless oil having a boiling point of 100–110° C. at a pressure of 10 mm. Hg. The crude oil was separated by vapour phase chromatography into its components. Over 85 percent of the mixture consisted of three components which by vapour density measurements were found to be isomeric and of average molecular weight 283. These were identified by infrared spectroscopy to be stereoisomers of 2,3,5,6-tetrakis(difluoramino)-p-dioxane. Analysis of the crude product gave C 19.9%, H 2.0%, N 13.9%, F 51.3%. $C_4H_4F_8N_4O_2$ requires C 16.4%, H 1.4%, N 19.2% and F 52.1%.

The crude, colourless oil prepared in this example, when ignited in a flame, burned rapidly but when heated under confinement detonated. It was found to have a plasticizing action on nitrocellulose and in compositions containing nitrocellulose similar to that of a plasticising mixture consisting of 80 parts nitroglycerine and 20 parts triacetin commonly used to plasticise cast double-base propellants. The substitution of nitroglycerine in cast double-base propellants by this colourless oil is advantageous in that it results in compositions of higher energy.

A propellant explosive consisting of 7 parts of the crude, colourless oil, 3 parts of nitrocellulose (12.6% N), 7 parts ammonium perchlorate and 3 parts of aluminium gave detonations when a ½ kg. mild steel hammer was dropped from a height of 10 cm. on a thin layer of the composition on a mild steel anvil but no detonations were obtained at a drop height of 5 cm.

Example 2

2 parts of glyoxal monohydrate were suspended in 10 parts methylene chloride and treated with approximately 5 parts difluoramine and 12.3 parts chlorosulphonic acid in the manner described in Example 1. After extraction and removal of the methylene chloride, 1.4 parts of a colourless oil was produced which was again identified by infra-red spectroscopy as 2,3,5,6-tetrakis(difluoramino)-p-dioxane.

Example 3

0.6 part of monoglyoxal was dissolved in 7 parts methylene chloride and treated with approximately 5 parts difluoramine and 8.8 parts fluorosulphonic acid in the manner described in Example 1. After extraction and removal of methylene chloride 0.4 g. of a colourless oil was produced and this was again identified by infra-red spectroscopy as 2,3,5,6-tetrakis(difluoramino)-p-dioxane.

Example 4

1 part of glyoxal monohydrate was suspended in 5 parts methylene chloride and treated with approximately 5 parts difluoramine and 5.2 parts fluorosulphonic acid in the manner described in Example 1. Extraction and removal of methylene chloride yielded 0.5 part of a colourless liquid which was again identified by infra-red spectroscopy as 2,3,5,6-tetrakis(difluoramino)-p-dioxane.

Example 5

2 parts of diacetyl were dissolved in 10 parts of methylene chloride at room temperature and stirred vigorously whilst approximately 5 parts liquid difluoramine, produced by condensation of gaseous difluoramine on a "cold-finger" condenser at $-80°$ C., were added dropwise to the solution. After reflux had been established for fifteen minutes, 3.1 parts chlorosulphonic acid were added slowly dropwise and reflux continued for a further five hours. Excess difluoramine was removed by purging with a slow stream of nitrogen and the reaction mixture poured into 10 parts of ice-water and shaken vigorously with a further 10 parts of methylene chloride in a separating funnel. The non-aqueous layer was removed, dried over anhydrous sodium sulphate and the solvent then removed to give 1.0 part of a deep red oil having a boiling point of $50°$–$60°$ C. at a pressure of 10 mm. Hg. The crude oil was separated by vapour-phase chromatography into its components of which one component constituted more than 85 percent. This component was found by vapour density measurements to have a molecular weight of 166 and was identified by infra-red spectroscopy as 1,2-dimethyl-1,2-bis (difluoramino)epoxyethane.

When ignited in a flame, the crude oil burned rapidly but when heated under confinement it detonated.

Example 6

1 part of diacetyl (1.0 g.) was dissolved in 6 parts of methylene chloride at room temperature and stirred vigorously. Difluoramine was refluxed on to the solution for three hours before 8.8 parts fluorosulphonic acid was slowly added dropwise. Reflux was continued for a further three hours. Treatment of the refluxed mixture in a similar manner to that described in Example 5 yielded 0.5 g. of a liquid product which was identified by infra-red spectroscopy 1,2-dimethyl-1,2-bis(difluoramino)epoxyethane.

Example 7

0.77 part of methyl glyoxal was dissolved in 5 parts of methylene chloride at room temperature and approximately 5 parts of liquid difluoramine were added dropwise to the solution as in Example 1 and the difluoramine was refluxed at $-80°$ C. for three hours. 5 parts fluorosulphonic acid were added dropwise to the mixture and difluoramine reflux continued for a further three hours. Treatment of the solution in the manner described in Example 5 yielded 0.5 part of a yellow liquid which was found by vapour density measurement to have a molecular weight of 307 and was identified by infra-red spectroscopy as dimethyl - 2,3,5,6 - tetrakis(difluoramino) - p-dioxane, which has a molecular weight of 320.

Analysis of the liquid product gave C, 23.1%; H, 2.5%; N, 17.5%; F, 46.3%. $C_6H_8F_8N_4O_2$ requires C, 22.5%; H, 2.5%; N, 17.5%; F, 47.5%.

When ignited in a flame, the yellow liquid prepared in this example burned rapidly but when heated under confinement it detonated.

What we claim is:

1. An explosive composition comprising nitrocellulose plasticized with a difluoramino compound consisting of

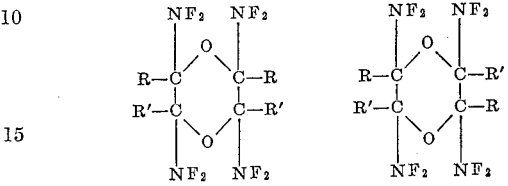

and

where R is selected from the group consisting of hydrogen and alkyl, R' is selected from the group consisting of hydrogen and alkyl and is hydrogen when R is alkyl, and each of R" and R''' is alkyl.

2. An explosive composition as in claim 1 wherein said difluoramino compound is a 2,3,5,6-tetrakis(difluoramino) derivative of an alkyl-substituted p-dioxane.

3. An explosive composition as in claim 1 wherein said difluoramino compound is dimethyl 2,3,5,6-tetrakis(difluoramino)-p-dioxane.

4. An explosive composition as in claim 1 wherein said difluoramino compound is a 1,2-dialkyl-substituted derivative of 1,2-bis(difluoramino)epoxyethane.

5. An explosive composition as in claim 1 wherein said difluoramino compound is 1,2-dimethyl 1,2-bis(difluoramino)epoxyethane.

6. A propellant explosive comprising ammonium perchlorate, aluminum and the explosive composition of claim 1.

References Cited

UNITED STATES PATENTS 3,103,456 9/1963 Lawton et al. _____ 149—1
3,166,595 1/1965 Frazer _____ 260—583

OTHER REFERENCES

Hoffman et al.: Chemical Reviews, vol. 62, 1962, p. 15.

BENJAMIN R. PADGETT, *Primary Examiner.*